(12) United States Patent
Croft et al.

(10) Patent No.: US 8,044,366 B2
(45) Date of Patent: Oct. 25, 2011

(54) METHOD FOR THE DETERMINATION OF THE NEUTRON MULTIPLICITY COUNTER DEAD TIME PARAMETER

(75) Inventors: Stephen Croft, Middlefield, CT (US); Robert D. McElroy, Jr., Middletown, CT (US); Sasha Philips, Cheshire, CT (US)

(73) Assignee: Canberra Industries, Inc., Meriden, CT (US)

( * ) Notice: Subject to any disclaimer, the term of this patent is extended or adjusted under 35 U.S.C. 154(b) by 1069 days.

(21) Appl. No.: 11/777,880

(22) Filed: Jul. 13, 2007

(65) Prior Publication Data

US 2011/0231138 A1    Sep. 22, 2011

Related U.S. Application Data

(60) Provisional application No. 60/830,526, filed on Jul. 13, 2006.

(51) Int. Cl.
G01T 3/00 (2006.01)
(52) U.S. Cl. .................. 250/390.01; 250/252.1
(58) Field of Classification Search .......... 250/390.01, 250/252.1
See application file for complete search history.

(56) References Cited

U.S. PATENT DOCUMENTS

| 3,786,256 | A | * | 1/1974 | Untermyer | 376/159 |
| 5,999,588 | A | | 12/1999 | Shao et al. | |
| 6,333,958 | B1 | * | 12/2001 | Stewart et al. | 377/10 |
| 6,420,712 | B1 | * | 7/2002 | Menlove et al. | 250/390.01 |
| 2002/0125439 | A1 | * | 9/2002 | Caldwell et al. | 250/395 |
| 2003/0205677 | A1 | * | 11/2003 | Caldwell et al. | 250/395 |

OTHER PUBLICATIONS

Evans et al. "Comparison of Deadtime Correction Factors for Passive Neutron Multiplicity Counting of Correlated and Non-Correlated Neutron Sources," Mar. 2009, WM2009 Conference,pp. 1-8.*
Holzleitner et al, "Dead-time correction for any multiplicity using list mode neutron multiplicity counters: A new approach—Low and medium count-rates," Radiation Measurements 46 (2011), pp. 340-356.*
Active Neutron Coincidence counting Techniques for 235U Mass Determination; ESARDA; Jul. 2005.
Keyser, et al; "A Digital Method for Dead Time Compensation Nuclear Spectroscopy"; ORTEC, PerkinElmer Instruments, Inc.; Oakridge, TN; May 15, 2011; 6 pp.
Langner, et al.; "A Large Multiplicity Counter for the Measurement of Bulk Plutonium"; Los Alamos National Laboratory; Los Alamos, NM; Jul. 1994; 7 pp.
Krick, et al.; "Energy-Dependent Bias in Plutonium Verification Measurements Using Thermal Neutron Multiplicity Counters"; Los Alamos National Laboratory; Los Alamos, NM; Apr. 20, 1998; http://lib-ww.lanl.gov/la-pubs/00412753.pdf; 12 pp.
"Passive Neutron Coincidence Counting Techniques for Pu Mass Determination"; ESARDA; Jan. 3, 2004; 4 pp.

(Continued)

*Primary Examiner* — Constantine Hannaher
*Assistant Examiner* — Christine Sung
(74) *Attorney, Agent, or Firm* — David W. Carstens; Steven H. Washam; Carstens & Cahoon, LLP

(57) ABSTRACT

A method is provided for simplifying the calibration of neutron multiplicity counters. The method includes multiplicity counter dead time correction algorithms that preclude the need for extended calibration steps with known radiation sources. The algorithms include approximations that allow calculation of the counter's efficiency without knowledge of sample source activity or origin.

9 Claims, 4 Drawing Sheets

Detection Efficiency, ε, for $^{252}Cf$ fission neutrons

OTHER PUBLICATIONS

Stewart, et al.; "New Shift-Register Electronics for Improved Precision of Neutron Coincidence and Multiplicity Assays of Plutonium and Uranium Mass"; Anatoly Gorobels, Research Institute of Atomic Reactors; Dimitrovgrad, Russia; Oct. 25, 1999; 12 pp.

* cited by examiner

Table 2. Summary Data for the 30 Neutron Counters examined in this study (banks equals to number of Pre-amps, TTL refers to output logic pulse)

| Counter | Efficiency | Detector Banks | Derandomizer Board | TTL Width (ns) | Die-Away (µs) | Pre-Delay (µs) | Gate Width (µs) | $f_d$ | $f_t$ | Coincidence Dead-time Parameter, a | | τ (ns) | Slope/4 λ/4 (ns) | |
|---|---|---|---|---|---|---|---|---|---|---|---|---|---|---|
| PSMC-HE | 60.9% | 20 | Yes | 20 | 36 | 3 | 46 | 0.5903 | 0.3589 | 185.1 | +/- 0.5 | 48.4 | 51.5 | +/- 0.3 |
| PSMC (J1) | 54.5% | 19 | No | 50 | 50 | 4.5 | 64 | 0.6264 | 0.3994 | 403.0 | +/- 1.0 | 105.3 | 106.9 | +/- 1.0 |
| PSMC (J2) | 54.5% | 19 | No | 50 | 50 | 4.5 | 64 | 0.6221 | 0.3933 | 403.5 | +/- 1.3 | 107.8 | 110.6 | +/- 1.0 |
| PSMC (E1) | 54.1% | 19 | Yes | 20 | 49 | 4.5 | 64 | 0.6205 | 0.3924 | 212.2 | +/- 0.4 | 54.1 | 54.2 | +/- 0.5 |
| PSMC (E2) | 54.2% | 19 | Yes | 20 | 49 | 4.5 | 64 | 0.6227 | 0.3946 | 212.4 | +/- 0.4 | 55.1 | 55.9 | +/- 0.6 |
| PSMC (E3) | 54.2% | 19 | Yes | 20 | 49 | 4.5 | 64 | 0.6214 | 0.3929 | 212.0 | +/- 0.4 | 54.2 | 54.9 | +/- 0.5 |
| PSMC (E4) | 54.5% | 19 | Yes | 20 | 48 | 4.5 | 64 | 0.6227 | 0.3940 | 209.9 | +/- 0.4 | 55.0 | 54.9 | +/- 0.5 |
| PSMC (E5) | 54.4% | 19 | Yes | 20 | 48 | 4.5 | 64 | 0.6250 | 0.3970 | 215.3 | +/- 0.3 | 55.4 | 56.8 | +/- 0.5 |
| PSMC (NMI) | 54.6% | 19 | Yes | 20 | 50 | 4.5 | 64 | 0.6170 | 0.3872 | 199.4 | +/- 1.0 | 51.8 | 52.4 | +/- 0.2 |
| HNMC | 50.7% | 54 | Yes | 20 | 29 | 2.5 | 35 | 0.5743 | 0.3468 | 73.9 | +/- 0.4 | 19.1 | 18.5 | +/- 0.2 |
| LEMC | 51.4% | 27 | Yes | 20 | 24 | 1.5 | 32 | 0.6378 | 0.4165 | 159.1 | +/- 1.3 | 41.7 | 41.7 | +/- 0.2 |
| FCAS | 40.0% | 14 | Yes | 50 | 50 | 4.5 | 64 | 0.6015 | 0.3704 | 270.5 | +/- 2.0 | 69.5 | 61.5 | +/- 0.6 |
| HNMC-Waste | 39.4% | 36 | Yes | 20 | 46 | 4.5 | 128 | 0.6239 | 0.4393 | 86.4 | +/- 1.2 | 23.2 | 20.7 | +/- 0.2 |
| PRMC1 | 37.4% | 14 | No | 50 | 73.7 | 4.5 | 90 | 0.6265 | 0.4005 | 400.2 | +/- 7.5 | 114.7 | 97.6 | +/- 3.0 |
| PRMC2 | 37.4% | 14 | No | 50 | 71.5 | 4.5 | 90 | 0.6262 | 0.3988 | 391.1 | +/- 7.4 | 116.6 | 99.2 | +/- 3.1 |
| ANMC | 34.0% | 36 | Yes | 20 | 45 | 4.5 | 64 | 0.6151 | 0.3933 | 102.3 | +/- 1.0 | 26.1 | 22.1 | +/- 0.7 |
| HA-AWCC | 32.0% | 28 | Yes | 20 | 45 | 4.5 | 64 | 0.6072 | 0.3849 | 91.7 | +/- 4.1 | 32.7 | 26.0 | +/- 1.3 |

FIG. 5

| | | | | | | | | | | | |
|---|---|---|---|---|---|---|---|---|---|---|---|
| HENC-1 | 29.0% | 16 | No | 50 | 52 | 4.5 | 128 | 0.6133 | 0.4039 | 667.2 +/- 4.9 | 176.3 | 138.6 +/- 5.6 |
| HENC-2 | 29.9% | 16 | Yes | 50 | 49 | 4.5 | 128 | 0.6147 | 0.4198 | 486.6 +/- 2.0 | 111.0 | 90.2 +/- 3.0 |
| HENC-3 | 30.0% | 16 | Yes | 50 | 50 | 4.5 | 128 | 0.6013 | 0.4008 | 465.0 +/- 2.0 | 119.0 | 96.6 +/- 2.2 |
| HENC-4 | 29.8% | 16 | Yes | 50 | 50 | 4.5 | 128 | 0.6204 | 0.4201 | 450.2 +/- 2.0 | 113.8 | 90.9 +/- 2.4 |
| AWCC | 31.0% | 6 | No | 50 | 51 | 4.5 | 64 | 0.6204 | 0.4201 | 810.2 +/- 3.7 | 204.4 | 162.5 +/- 1.4 |
| HA-AWCC* | 27.5% | 26 | Yes | 20 | 55 | 4.5 | 64 | 0.6027 | 0.4120 | 96.3 +/- 2.4 | 35.2 | 27.3 +/- 1.2 |
| IWAS 1 | 26.0% | >40 | Yes | 20 | 56 | 4.5 | 128 | 0.7086 | 0.5247 | 103.8 +/- 1.8 | 29.6 | 22.1 +/- 2.1 |
| IWAS 2 | 26.3% | >40 | Yes | 20 | 56 | 4.5 | 128 | 0.7074 | 0.5200 | 101.1 +/- 1.8 | 24.3 | 18.4 +/- 2.1 |
| IWAS 3 | 25.7% | >40 | Yes | 20 | 56 | 4.5 | 128 | 0.7047 | 0.5168 | 108.1 +/- 1.8 | 22.0 | 16.7 +/- 2.2 |
| IWAS 4 | 26.1% | >40 | Yes | 20 | 56 | 4.5 | 128 | 0.7039 | 0.5149 | 98.1 +/- 1.8 | 21.1 | 15.7 +/- 2.1 |
| AWCC | 25.4% | 6 | Yes | 20 | 52 | 4.5 | 64 | 0.6359 | 0.4093 | 676.9 +/- 1.7 | 160.8 | 119.2 +/- 1.8 |
| AWCC | 25.6% | 6 | No | 50 | 52 | 4.5 | 64 | 0.6717 | 0.4628 | 888.7 +/- 1.5 | 191.7 | 149.0 +/- 1.8 |
| AWCC | 25.9% | 6 | No | 50 | 51 | 4.5 | 64 | 0.6150 | 0.4150 | 944.4 +/- 1.7 | 203.7 | 148.7 +/- 3.0 |
| JCC-21S | 16.0% | 12 | No | 50 | 85 | 4.5 | 128 | 0.6023 | 0.3921 | 584.6 +/- 11.3 | 155.0 | 99.8 +/- 12.5 |
| AWCC (1 bank) | 4.5% | 2 | No | 50 | 50 | 4.5 | 64 | 0.6245 | 0.4168 | 4261.0 +/- 112.0 | 984.0 | 520.6 +/- 89.3 |

FIG. 5
(Cont'd)

METHOD FOR THE DETERMINATION OF THE NEUTRON MULTIPLICITY COUNTER DEAD TIME PARAMETER

CROSS-REFERENCE TO RELATED APPLICATIONS

This application claims the benefit of provisional Application No. 60/830,526, filed Jul. 13, 2006.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to neutron radiation detectors. More specifically, the present invention relates to a method for calibrating neutron multiplicity counters.

2. Description of Related Art Including Information Disclosed Under 37 CFR 1.97 and 1.98

Correlated neutron counting using shift register analysis is an important and long established tool for the detection and quantification of fission events in waste and safeguards. A crucial step in the manipulation of the resultant multiplicity histograms to correlated event rate is the application of correction factors for dead-time losses. Dead time correction can limit the accuracy especially when highly efficient counters are used to measure items of high neutron output where a high proportion of the primary neutrons are random (e.g. ($\alpha$, n) events).

There is presently no complete treatment for this problem. Advances in instrumentation design to lessen the effects are an important active area of interest. However, these approaches also require similar correction, albeit of lesser magnitude, until a higher event rate is reached. Thus dead time correction remains a vital area of importance in neutron counting.

At present the most popular approach to making allowance for dead time losses is based on the approximation developed by Nikolai Dytlewski. In this scheme, the losses in the signal triggered rates can be compensated for by using histogram multipliers which are functions of a single free parameter—the dead-time parameter, $\tau$. In practice however some additional empirical adjustments are often required. The issue then becomes how to best find the optimum value of the dead-time parameter.

The traditional method of applying dead-time corrections to passive neutron coincidence counting based on shift register electronics is typified by the treatment described by Menlove and Swansen for the case of the HLNCC-II. The singles rate is corrected using the exponential of a quadratic through the origin of the observed Singles rate. The Reals rate is only a function of the Singles rate and is set equal to the Singles correction factor raised to the fourth power.

A variation used by some is to replace the quadratic by the corrected Singles rate itself so that the expression is transcendental but for all practical purposes can be evaluated using a low order (e.g. 7) nested set of exponentials. The multiplier for the Reals correction is also left as a free parameter although the expectation is that it be close to four times that of the Singles dead-time parameter. This approach is set out in Croft and Yates. However, for multiplicity counting the correction for Triples is more complex and the approximate approach described by Dytlewski is the most widely used treatment.

Accordingly, a need exists for a more efficient calibration method that allows for field calibrations and verifications of the multiplicity dead time parameter. Further, a need exists for a calibration method that reduces the required number of reference sources and lengthy measurement times. Further, a need exists for a simplified calibration method that allows for readily repeatable calibrations to be performed over the life of a counter. Finally, a need exists for a method for calibration that does not require use of costly NIST certified source. The present invention satisfies these needs and others as will be explained in the following description.

BRIEF SUMMARY OF THE INVENTION

The present invention provides a new method for calibration of a neutron multiplicity counter dead time parameter. This method is based on measuring the Singles (S), Doubles (D), and Triples (T), rates for a small set of $^{252}$Cf sources spanning a wide dynamic range. The plot of the uncorrected T/D rate ratio against the observed S-rate is shown empirically to be linear with a slope of $4\tau$. This behavior is consistent for a wide variation of counter types spanning a wide range of efficiency and a wide number of pre-amplifiers in a given system. This new approach is quick and simple to implement and allows for repeatable field calibration of virtually all available neutron multiplicity counters.

Normally, at least one well characterized $^{252}$Cf source, traceable to a national laboratory such as NIST is required to determine the neutron detection efficiency of a multiplicity counter. In practice you need several, because as it turns out most of the characterized sources available from commercial sources are suspect. With the method of the present invention, you do not need traceability; any set of $^{252}$Cf sources that have sufficient neutron output can be used in a calibration.

BRIEF DESCRIPTION OF THE SEVERAL VIEWS OF THE DRAWING(S)

The present invention will be more fully understood by reference to the following detailed description of the preferred embodiments of the present invention when read in conjunction with the accompanying drawings, in which like reference numbers refer to like parts throughout the views, wherein:

FIG. 1 is a plot of the non dead-time Triples to Doubles ratio as a function of count rate for a series of $^{252}$Cf point sources from a Plutonium Scrap Multiplicity Counter. The slope of the linear fit to the data is equal to 4 times the multiplicity dead-time parameter, $\tau$ for this counter (slope/4= (106.9+/−1.0) ns compared to the measured dead time parameter of 105.3 ns). For comparison, the expected exponential curve is shown;

Figure 4:
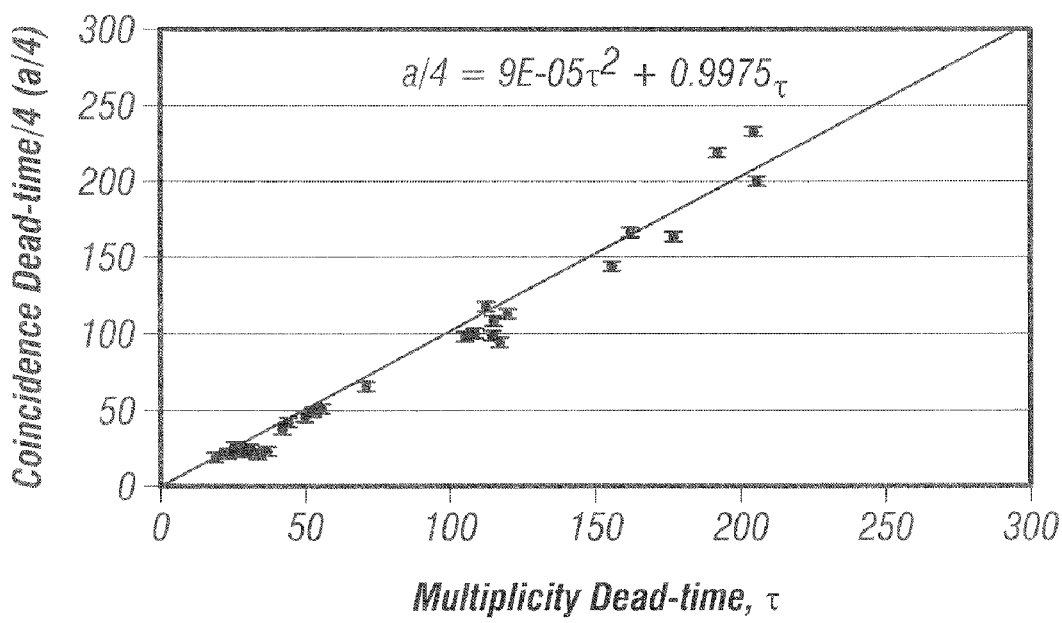

FIG. 4 is a plot of the slope of the Triples to Doubles curves divided by the observed standard coincidence dead-time parameter, a, as a function of neutron detection efficiency. The uncertainties are shown indicating that the deviations are meaningful; and FIG. 5 is a table of date representing a summary of the basic counter parameters from a group of 32 multiplicity systems calibrated over a span of approximately 10 years.

All figures are drawn for ease of explanation of the basic teachings of the present invention only; the extensions of the figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

DETAILED DESCRIPTION OF THE INVENTION

Examination of non-dead-time corrected rates is helpful in dead-time calibrations. A plot of the ratio of the non dead-time corrected Triples rates, $T_m$, to Doubles rate, $D_m$, yields a linear function of the non dead-time corrected Singles rate, $S_m$. The preferred embodiment of the present invention utilizes this linear fit in subsequent dead-time calibrations.

In Dytlewski's approach, the Singles or Trigger rate is corrected empirically while a special formalism is required for the Doubles and Triples. Hybrid solutions suggest themselves where the traditional approaches are used for the Singles and Doubles wherever needed with only the histogram based treatment being applied to the Triples term. This last approach avoids discrepancy between standard neutron coincidence counter (NCC) and multiplicity results but introduces some complications in the propagation of rates errors.

In the preferred embodiment, the dead-time corrected Doubles and Triples neutron coincidence rates are determined as follows:

$$D = \left\{ \sum_{i=1}^{n} (p_i - q_i) \cdot \alpha_i \right\} \cdot e^{\tau \cdot S_m} \cdot e^{c \cdot S_m} \cdot S_m \quad (1)$$

$$T = \left\{ \sum_{i=2}^{n} \beta_i (p_i - q_i) - \sum_{i=1}^{n} \alpha_i (p_i - q_i) \cdot \sum_{i=1}^{n} \alpha_i \cdot q_i \right\} \cdot e^{\tau \cdot S_m} \cdot e^{d \cdot S_m} \cdot S_m \quad (2)$$

where traditionally, $$\alpha_i = 1 + \sum_{j=0}^{i-2} \binom{i-1}{j+1} \frac{(j+1)^j \phi^j}{[1-(j+1)\cdot\phi]^{j+2}} \quad (3)$$

and $$\beta_i = \alpha_i - 1 + \sum_{j=0}^{i-3} \binom{i-1}{j+2} \frac{(j+1)(j+2)^j \phi^j}{[1-(j+2)\cdot\phi]^{j+3}}$$

where $S_m$ is the non-dead-time corrected Singles rate, D, and T are the dead-time corrected Doubles, and Triples rates respectively, $\phi=\tau/G$, $\tau$ is the characteristic dead-time parameter, G is the coincidence gate width, c and d are empirical Doubles and Triples dead-time parameters, and $p_i$ and $q_i$ are the normalized elements of the observed (R+A) and A multiplicity histograms respectively.

Calibration for the dead-time parameters, c (or $\tau_D$), d (or $\tau_T$) and $\tau$, is performed by measurement of a series of $^{252}$Cf sources spanning the expected count rate range (typically 1 kHz to 1 MHz). Because there is no significant multiplication or ($\alpha$, n) reaction rate with the $^{252}$Cf sources, the ratios of T/D, T/S and D/S should be constant and, once corrected, independent of source strength. The dead-time correction parameters are then determined adjustment of the parameters to obtain the minimum Chi-Square value for each of the rates ratios. A typical data set is provided in Table 1.

TABLE 1

Summary of Multiplicity Dead-time parameter determination data, final results for a PSMC-01.

| Source ID | Singles Rate | Doubles Rate | Triples Rate | D/S | T/S | T/D |
|---|---|---|---|---|---|---|
| G351 | 11414.88 | 6170.06 | 1891.71 | 0.5405 | 0.1657 | 0.3066 |
| 95-4 | 20237.77 | 10941.61 | 3345.45 | 0.5407 | 0.1653 | 0.3058 |
| C880 | 26414.25 | 14300.73 | 4398.16 | 0.5414 | 0.1665 | 0.3075 |
| Am(Li) + 95-4 | 35259.96 | 5852.38 | 1799.20 | | | 0.3074 |
| C881 | 56165.34 | 30337.65 | 9235.92 | 0.5401 | 0.1644 | 0.3044 |
| C882 | 171614.78 | 92923.73 | 28501.76 | 0.5415 | 0.1661 | 0.3067 |
| CF-003 | 395295.28 | 213425.51 | 65683.62 | 0.5399 | 0.1662 | 0.3078 |
| Cf003 + C882 | 567286.43 | 306993.16 | 93750.35 | 0.5412 | 0.1653 | 0.3054 |
| Average Ratios | | | | 0.5408 | 0.1656 | 0.3065 |
| Standard Deviation (%) | | | | 0.11% | 0.42% | 0.38% |
| Parameter $\tau$ | 105.23 +/− 0.45 ns | | | | | |
| Parameter c | 75.8 +/− 2.9 ns | | | | | |
| Parameter d | 75.8 +/− 2.9 ns | | | | | |

Figure 1:
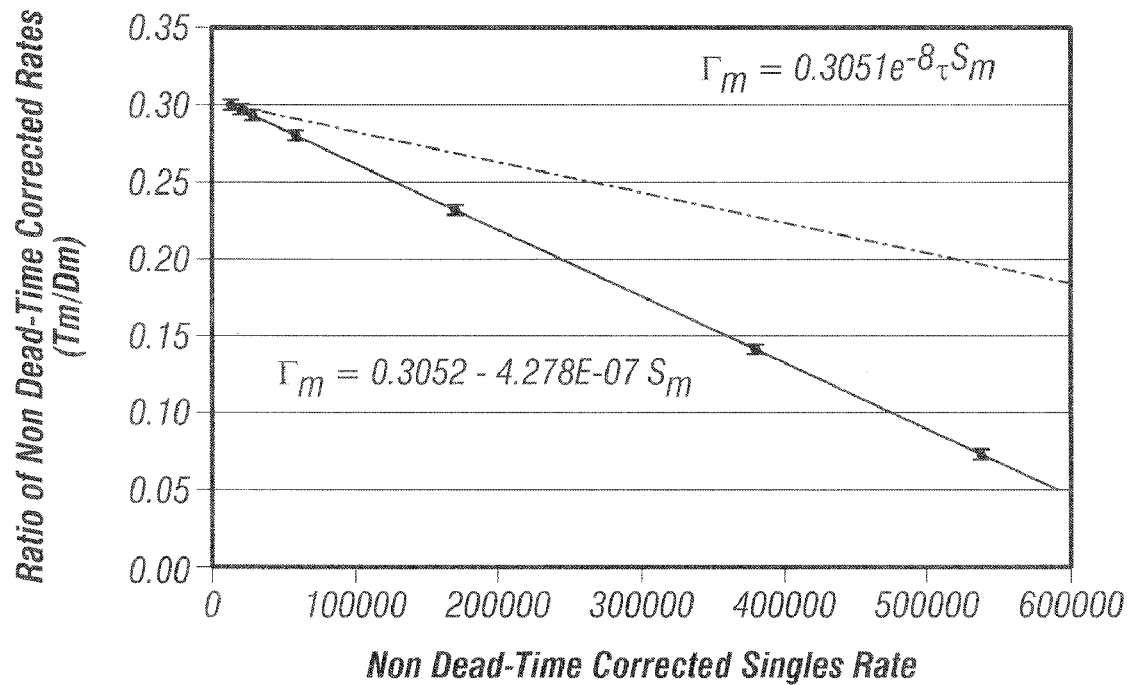

FIG. 1 presents a plot of the dead-time calibration of a Plutonium Scrap Multiplicity Counter (PSMC). This figure shows a plot of the non-dead-time Triples to Doubles ratio as a function of count rate for a series of 252Cf point sources from a Plutonium Scrap Multiplicity Counter (PSMC). The slope of the linear fit to the data is equal to four times the multiplicity dead-time parameter, $\tau$, for this counter [slope/4=(106.9±1.0) ns compared to the measured dead-time parameter of 105.3 ns]. For comparison, the expected exponential curve is shown.

For later reference this linear function, $\Gamma_m$, is described as:

$$\Gamma_m \equiv \frac{T_m}{D_m} = \Gamma_0 + \lambda \cdot S_m \quad (4)$$

From this, the result is an exponential response function of the kind:

$$\Gamma_m \equiv \frac{T_m}{D_m} = \Gamma_0 e^{-8\tau \cdot S_m} = \Gamma_0 e^{2\lambda \cdot S_m} \quad (5)$$

Note that the zero rate intercept of this curve, $\Gamma_0$, is the Triples rate equivalent of the well known Doubles rate parameter $\rho_0$ used in traditional NCC counting. The value of $\Gamma_0$ can be calculated using Equation 6.

$$\Gamma_0 = \frac{1}{3} \cdot \frac{\overline{v_{s3}}}{\overline{v_{s2}}} \cdot \frac{f_t}{f_d} \cdot \varepsilon \cong 0.8865 \cdot \frac{f_t}{f_d} \cdot \varepsilon \quad (6)$$

where $v_{s2}$ and $v_{s3}$ are the 2nd and 3rd factorial moments of the spontaneous fission multiplicity distribution for $^{252}Cf$ respectively, $f_d$ and $f_t$ are the Doubles and Triples coincidence gate fractions, and $\varepsilon$ is the absolute detection efficiency for $^{252}Cf$ spontaneous fission neutrons.

The method of the present invention considered neutron counters with detection efficiencies of approximately 50%. The intriguing aspect of the curves from these counters was that the slope, $\lambda$, of each of these ratio curves was approximately equal to the coincidence (Reals) dead-time parameter, a, but was consistent with $4\tau$ to within statistical errors. The prospect of a simple determination of the multiplicity dead-time parameter, $\tau$, warranted further examination. Similar data sets were collected from very dissimilar neutron counters spanning the efficiency range from 4.5% to 61% and from a single detector bank to 54 banks; each exhibited a simple linear response. However, rather than the simple correlation between $\lambda$ and $\tau$ observed for the initial data sets, a strong efficiency dependence was observed. This is evident in FIG. 2. This figure presents a plot of the slope of the Triples to Doubles Curves divided by the observed characteristic counter dead-time as a function of neutron detection efficiency for a series of 32 diverse neutron counters.

FIG. 5 presents a summary of the basic counter parameters from a group of 32 multiplicity systems calibrated over a span of about 10 years. The range of system designs provides a means of ascertaining the importance of the different variables on the dead-time. The data sets also include multiple units of the same design allowing an assessment of the reproducibility of the results.

Figure 2:
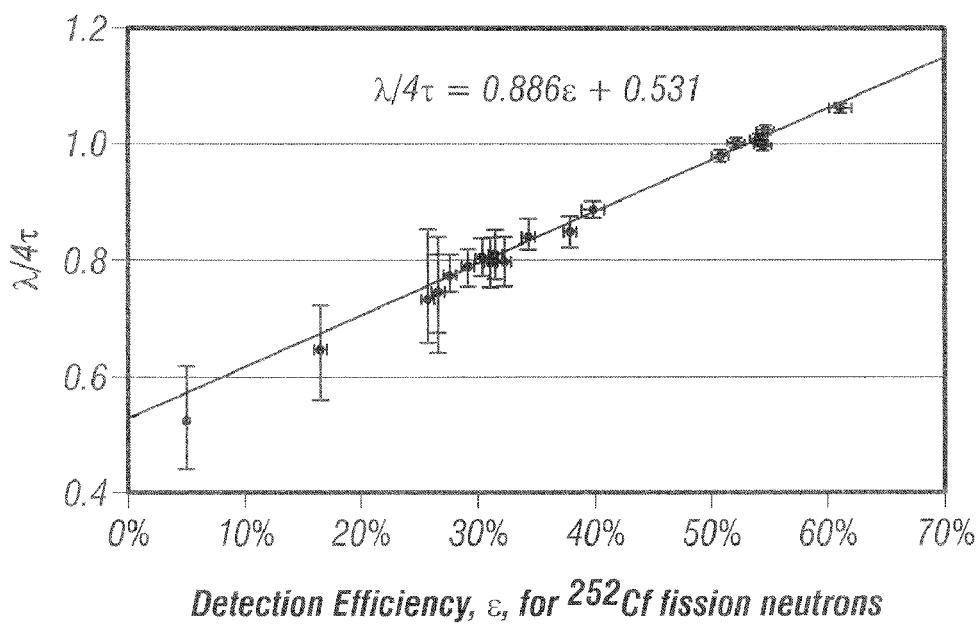
FIG. 2 is a plot of the slope of the Triples to Doubles curves divided by the observed characteristic counter dead-time as a function of neutron detection efficiency for a series of 32 diverse neutron counters.

The measured histograms from the calibrations of the systems in FIG. 5 were reanalyzed for this study to ensure consistency in the analysis. The plot in FIG. 2 compares the slope, $\lambda$, of the Triples to Doubles ratio curves for each of the multiplicity systems. The data were fit to the simple linear function given as Equation 7.

$$\frac{\lambda}{4\tau} = a + b \cdot \varepsilon \quad (7)$$

The fit results in the following values and it is interesting to note that the parameter b is consistent with the book value of $\overline{v_{s3}}/3 \cdot \overline{v_{s2}}$. The fitted value for the parameter b=(0.8864±0.0167).

Equation 6 suggests that the fit to the data would be improved by including a dependence on the coincidence gate fractions. To investigate this possibility the data was refit to the following functional form:

$$\frac{\lambda}{4\tau} = a + b \cdot \left(\frac{f_t}{f_d}\right)^c \cdot \varepsilon \quad (8)$$

Figure 3:
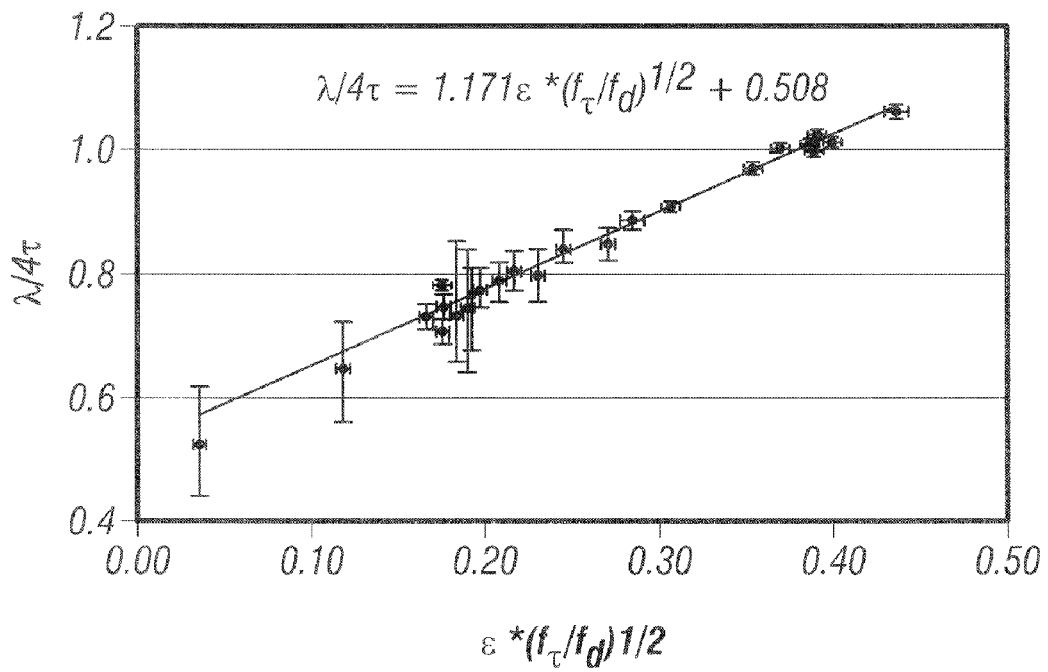
FIG. 3 is a plot of the slope of the Triples to Doubles curves divided by the observed characteristic counter dead-time as a function of neutron detection efficiency modified by the gate fractions for the series of 32 neutron counters.

Accordingly, the best fit to the data occurs for c=0.5 rather than the expected linear dependence. The plot of the data (FIG. 3) in this representation does not appear markedly different from the simpler form shown in FIG. 2, and both fits yield equivalent $\chi^2$ values. However, the slope of the curve, b=(1.171±0.022) which is close to the value of $(\overline{v_{s3}}/3 \cdot \overline{v_{s2}})^{-1/2}=1.198$. It is important to note that the ratio $f_t/\theta_d$ is used rather than substituting $f_d$. The familiar approximation $f_t = \theta_d^2$ can introduce an error of about 1% for a cadmium lined neutron well counter and as much as several percent for a rectangular counter such as the HENC. FIG. 3 presents a plot of the slope of the Triples to Doubles curves divided by the observed characteristic counter dead-time as a function of neutron detection efficiency modified by gate fractions for the series of 32 neutron counters.

The present invention also considers the relation between the characteristic dead-time parameter, $\tau$, and the standard coincidence dead-time. While there is a general correlation between the dead-time parameters and, on average, $\tau \approx \alpha/4$, the deviations between the $\tau$ and $\alpha/4$ are typically on the order of 5% but can be as large as 40%. FIG. 4 presents this relationship. This figure is a plot of the slope of the Triples to Doubles curves divided by the observed standard coincidence dead-time parameter, $\alpha$, as a function of neutron detection efficiency. The uncertainties are shown indicating that the deviations are meaningful.

Detector Calibration

Using the disclosed inventive method in the preferred embodiment, a neutron multiplicity dead-time correction calibration generally consists of the measurement of a series of $^{252}Cf$ sources ranging in neutron emission rate from 1000 cps to 2,000,000 neutrons per second. Each of these sources is placed in the center of the neutron assay cavity and counted for a period of time ranging from 1 hour to 8 hours. The calibration yields Reals+Accidentals and Accidentals multiplicity histograms for each source. The histogram data is used to calculate the dead-time corrected singles, doubles, and triples neutron coincidence rates using equations 1, 2 and 3 (above). The dead-time correction parameters are then determined via a Chi-square minimization process as discussed above.

Detector Efficiency

Using the equations in the present embodiment, a determination of the neutron detection efficiency can be made without knowledge of the source strength. Both the characteristic dead-time parameter, $\tau$, and the slope, $\lambda$, of the T/D-ratio can be determined without knowing the absolute neutron emission rate of the $^{252}Cf$ sources. The observed efficiency dependence of the ratio of these two values suggests that these previous measurements can be used to determine the efficiency of the neutron counter without knowing the source strength.

By treating the fit results to Equations 7 and 8 as calibrations, the efficiency for a counter can be calculated from the values $\tau$ and $\lambda$ in FIG. 5. The results of these calculations are presented in Table 3.

$$\varepsilon = \frac{\left(\frac{\lambda}{4\tau} - a\right)}{b} \quad (9)$$

and $$\varepsilon = \frac{\left(\frac{\lambda}{4\tau} - a\right)\left(\frac{f_t}{f_d}\right)^{1/2}}{b} \quad (10)$$

The approximate measurement uncertainties are given in Table 3 along with each of the efficiency values. The "measured efficiency" is based on a weighted average of several $^{252}$Cf sources of known output. The limiting factor in the uncertainty is the source certificates from the suppliers. The uncertainty in the efficiencies determined by examination of the dead-time values is presently dominated by the statistical precision of the measurement. The typical multiplicity dead-time calibrations include measurements of 6 to 9 different neutron emission rates, each lasting from 1 to 4 hours. A full calibration therefore requires about 2 calendar days to complete. Longer counting periods will dramatically improve the measurement precision.

To determine the neutron detection efficiency without the use of traceable standards we also calculate the non dead-time corrected rates. To determine the non dead-time corrected rates, the rather complex α and β arrays used by Dytlewski are replaced by the traditional weighting factors for determination of the moments of a distribution given as follows:

$$\alpha_i = i, \beta_i = \frac{i(i-1)}{2} \quad (11)$$

The ratio of the resulting non dead-time corrected triples and doubles rates are plotted as a function of the non dead-time corrected singles rates. The ratio of non dead-time corrected T:D is a linear function of the non dead-time corrected singles rate. The slope, $\lambda$, of this linear function can be used with the characteristic dead-time parameter, $\tau$, for the counter to determine the neutron detection efficiency.

Examination of the data sets for a large number of neutron multiplicity coincidence counting systems has shown that this ratio of $\lambda/\tau$ is related to the neutron detection efficiency as

TABLE 3

Results of efficiency determination from the observed dead time.

| Counter | Measured Efficiency | Efficiency from Eq. 9 | Relative Difference | Efficiency from Eq. 10 | Relative Difference |
|---|---|---|---|---|---|
| PSMC-HE | 0.609 +/− 0.003 | 0.602 +/− 0.006 | 1.1% | 0.610 +/− 0.006 | −0.2% |
| PSMC (J1) | 0.545 +/− 0.004 | 0.547 +/− 0.011 | −0.3% | 0.543 +/− 0.010 | 0.4% |
| PSMC (J2) | 0.545 +/− 0.004 | 0.559 +/− 0.011 | −2.6% | 0.557 +/− 0.010 | −2.3% |
| PSMC (E1) | 0.541 +/− 0.004 | 0.532 +/− 0.010 | 1.8% | 0.531 +/− 0.010 | 1.9% |
| PSMC (E2) | 0.542 +/− 0.004 | 0.546 +/− 0.012 | −0.9% | 0.544 +/− 0.011 | −0.5% |
| PSMC (E3) | 0.542 +/− 0.004 | 0.543 +/− 0.010 | −0.2% | 0.542 +/− 0.009 | 0.1% |
| PSMC (E4) | 0.545 +/− 0.004 | 0.527 +/− 0.010 | 3.5% | 0.526 +/− 0.009 | 3.5% |
| PSMC (E5) | 0.544 +/− 0.004 | 0.558 +/− 0.010 | −2.5% | 0.554 +/− 0.009 | −1.9% |
| PSMC (NM1) | 0.546 +/− 0.008 | 0.543 +/− 0.005 | 0.4% | 0.544 +/− 0.005 | 0.3% |
| HNMC | 0.507 +/− 0.005 | 0.492 +/− 0.010 | 3.0% | 0.504 +/− 0.009 | 0.4% |
| LEMC | 0.514 +/− 0.005 | 0.530 +/− 0.007 | −3.0% | 0.521 +/− 0.006 | −1.3% |
| FCAS | 0.400 +/− 0.004 | 0.400 +/− 0.010 | −0.1% | 0.411 +/− 0.010 | −2.8% |
| HNMC-Waste | 0.394 +/− 0.004 | 0.410 +/− 0.009 | −3.9% | 0.393 +/− 0.008 | 0.2% |
| PRMC1 | 0.374 +/− 0.004 | 0.362 +/− 0.030 | 3.4% | 0.367 +/− 0.028 | 1.9% |
| PRMC2 | 0.374 +/− 0.004 | 0.361 +/− 0.030 | 3.6% | 0.367 +/− 0.028 | 1.9% |
| ANMC | 0.340 +/− 0.003 | 0.356 +/− 0.029 | −4.5% | 0.361 +/− 0.027 | −6.3% |
| HA-AWCC | 0.320 +/− 0.003 | 0.301 +/− 0.044 | 6.3% | 0.311 +/− 0.041 | 2.9% |
| HENC-1 | 0.290 +/− 0.003 | 0.288 +/− 0.036 | 0.6% | 0.293 +/− 0.034 | −1.0% |
| HENC-2 | 0.299 +/− 0.003 | 0.318 +/− 0.030 | −6.1% | 0.315 +/− 0.028 | −5.5% |
| HENC-3 | 0.300 +/− 0.003 | 0.318 +/− 0.021 | −5.7% | 0.319 +/− 0.019 | −6.3% |
| HENC 4 | 0.298 +/− 0.003 | 0.303 +/− 0.023 | −1.8% | 0.303 +/− 0.022 | −1.6% |
| AWCC | 0.310 +/− 0.003 | 0.298 +/− 0.008 | 3.9% | 0.298 +/− 0.007 | 3.8% |
| HA-AWCC* | 0.275 +/− 0.003 | 0.276 +/− 0.037 | −0.42% | 0.276 +/− 0.034 | −0.5% |
| IWAS 1 | 0.260 +/− 0.003 | 0.243 +/− 0.079 | 7.11% | 0.236 +/− 0.069 | 9.1% |
| IWAS 2 | 0.263 +/− 0.003 | 0.256 +/− 0.096 | 2.89% | 0.249 +/− 0.085 | 5.5% |
| IWAS 3 | 0.257 +/− 0.003 | 0.258 +/− 0.111 | −0.40% | 0.250 +/− 0.098 | 2.4% |
| IWAS 4 | 0.261 +/− 0.003 | 0.241 +/− 0.114 | 8.19% | 0.236 +/− 0.101 | 9.4% |
| AWCC | 0.254 +/− 0.003 | 0.238 +/− 0.013 | 6.92% | 0.249 +/− 0.012 | 2.2% |
| AWCC | 0.256 +/− 0.003 | 0.278 +/− 0.011 | −7.96% | 0.277 +/− 0.010 | −8.3% |
| AWCC | 0.259 +/− 0.003 | 0.225 +/− 0.016 | 15% | 0.231 +/− 0.015 | 10.8% |
| JCC-21S | 0.160 +/− 0.002 | 0.128 +/− 0.091 | 25% | 0.144 +/− 0.085 | 9.8% |
| AWCC (1 bank) | 0.045 +/− 0.001 | 0.002 +/− 0.102 | — | 0.022 +/− 0.095 | 50.3% |

The results show some unexpected dependencies of the dead-time parameter such as a linear response of the uncorrected Triples to Doubles ratio as a function of the Singles rate. This linear behavior can be used to greatly simplify the calibration of a detection system. Count times of several hours per source and a minimum of 6 measurements spanning a count rate range of 1 kHz to 1 MHz are expected to be necessary to achieve 1% accuracy in the efficiency value for counters with greater than 30% detection efficiency.

shown in FIG. 2 and FIG. 3. So by using the simple relationships shown in FIG. 9 or FIG. 10, the neutron detection efficiency can be determined.

Although the invention hereof has been described by way of a preferred embodiment, it will be evident that other adaptations and modifications can be employed without departing from the spirit and scope thereof. For example, some of the calibration steps in the inventive method could be conducted automatically as well as by manual entry for spreadsheet analysis. The terms and expressions employed herein have been used as terms of description and not of limitation; and thus, there is no intent of excluding equivalents, but on the contrary it is intended to cover any and all equivalents that may be employed without departing from the spirit and scope of the invention 58,266.

We claim:

1. A method for applying dead-time corrections to a passive neutron multiplicity counter, the dead-time parameters comprising: a characteristic dead time parameter ("$\tau$"); an empirical Doubles dead-time parameter ("$\tau_D$"); and an empirical Triples dead-time parameter ("$\tau_T$"), the method comprising:
   (a) determining an expected count range of the passive neutron multiplicity counter;
   (b) measuring one or more $^{252}$Cf sources within the count range;
   (c) determining a non-dead-time corrected Singles, Doubles, and Triples rate for the one or more sources;
   (d) calculating the Doubles to Singles ratio;
   (e) calculating the Triples to Singles ratio;
   (f) calculating the Triples to Doubles ratio;
   (g) determining a minimum chi-square distribution of the Doubles to Singles ratio, the Triples to Singles ratio, and the Triples to Doubles ratio by adjusting the dead-time correction parameters $\tau$, $\tau_D$, and $\tau_T$;
   (h) establishing optimum dead-time correction parameters for $\tau$, $\tau_D$, and $\tau_T$ by noting the corresponding values that yielded the minimum chi-square distribution of the ratios; and
   (i) applying the optimum dead-time correction parameters to the calibration of the passive neutron multiplicity counter.

2. The method of claim 1 further comprising:
   (c)(1) determining the Doubles and Triples coincidence gate fractions.

3. A computer program product comprising a computer-readable medium having instructions, the instructions being operable to enable a computer to execute a procedure for performing the method of claim 1, the program instructions comprising:
   (a) determining an expected count range of the passive neutron multiplicity counter;
   (b) measuring one or more $^{252}$Cf sources within the count range;
   (c) determining a non-dead-time corrected Singles, Doubles, and Triples rate for the one or more sources;
   (d) calculating the Doubles to Singles ratio;
   (e) calculating the Triples to Singles ratio;
   (f) calculating the Triples to Doubles ratio;
   (g) determining a minimum chi-square distribution of the Doubles to Singles ratio, the Triples to Singles ratio, and the Triples to Doubles ratio by adjusting the dead-time correction parameters $\tau$, $\tau_D$, and $\tau_T$; and
   (h) establishing optimum dead-time correction parameters for $\tau$, $\tau_D$, and $\tau_T$ by noting the corresponding values that yielded the minimum chi-square distribution of the ratios.

4. The computer program product of claim 3, the program instructions further comprising:
   (c)(1) determining the Doubles and Triples coincidence gate fractions.

5. The computer program product of claim 3, the program instructions further comprising:
   (i) applying the optimum dead-time correction parameters to the calibration of the passive neutron multiplicity counter.

6. A method for determining the efficiency of a passive neutron multiplicity counter through the use of one or more calibration sources of unknown strength and origin, the method comprising:
   (a) determining the non-dead-time corrected Singles, Doubles, and Triples rates of the detector;
   (b) plotting the ratio of the non-dead-time corrected Triples and Doubles rates as a function of the non-dead-time corrected Singles rate; and
   (c) determining the detector efficiency utilizing the resultant slope of the linear function ("$\lambda$") with the characteristic dead time parameter ("$\tau$").

7. The method of claim 6 wherein the one or more sources span the count range of about 1 kHz to 1 MHz.

8. A computer program product comprising a computer-readable medium having instructions, the instructions being operable to enable a computer to execute a procedure for performing the method of claim 6, the program instructions comprising:
   (a) determining the non-dead-time corrected Singles, Doubles, and Triples rates of the detector;
   (b) plotting the ratio of the non-dead-time corrected Triples and Doubles rates as a function of the non-dead-time corrected Singles rate; and
   (c) determining the detector efficiency utilizing the resultant slope of the linear function ("$\lambda$") with the characteristic dead time parameter ("$\tau$").

9. The computer program product of claim 8, wherein the one or more sources span the count range of about 1 kHz to 1 MHz.

* * * * *